July 9, 1929.  V. A. VAN HORNE  1,720,190
CONFECTION HOLDER
Filed April 4, 1927
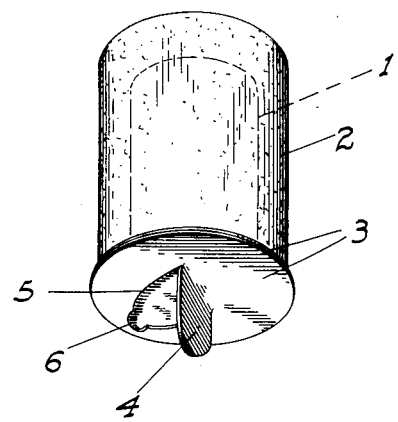
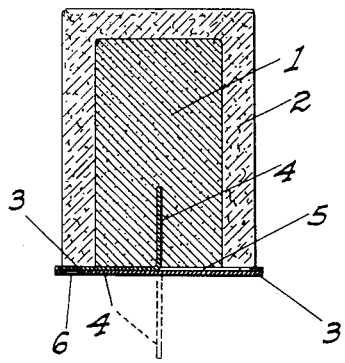
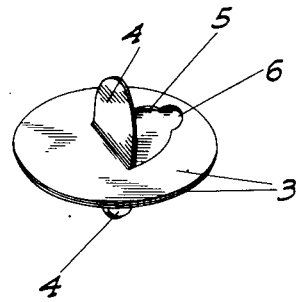
INVENTOR
V. A. Van Horne
BY
ATTORNEY Patented July 9, 1929.

1,720,190

UNITED STATES PATENT OFFICE.

VERNON A. VAN HORNE, OF STOCKTON, CALIFORNIA.

CONFECTION HOLDER.

Application filed April 4, 1927. Serial No. 180,944.

This invention relates to improvements in frozen confections, particularly of that particular type which is put out on a commercial scale in the form of a small unitary article to be individually sold and arranged to be consumed while being supported by the hand.

Some such confections are now marketed in wrappers, which form the sole supporting means for the confection while it is being eaten and the warmth of the hand grasping the wrapper tends to melt the confection, which destroys the firm condition thereof and renders the same messy to handle further.

Other confections are supported on wooden sticks which serve as the handles. The wood, however, is apt to impart an unpalatable flavor to the confection. Further, these sticks take up considerable space and render it awkward to compactly pack and ship the goods.

The principal object of my invention therefore is to provide a holder for a product of this character so arranged that the consumer is provided with a handle member for supporting and manipulating the confection without the need of his ever touching the product itself with his hands. At the same time the handle is normally folded flat against one end of the confection and is of such a nature that the space taken up thereby when shipping the goods is negligible. The material of which the holder is made is also of such a character that no obnoxious flavor will be imparted to the confection and the latter is maintained in a thoroughly sanitary and appetizing condition.

A further object of the invention is to provide a novel confection for which my improved holder is especially adapted.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective elevation of the confection with the holder attached thereto in position for use.

Fig. 2 is a sectional elevation of the confection and holder with the outer or handle tab on the latter shown in its folded position.

Fig. 3 is a perspective elevation of the holder detached.

Referring now more particularly to the characters of reference on the drawings, the confection itself comprises a core 1 of ice cream surrounded and enclosed on one end by a shell 2 of frozen fruit juices or the like. This confection is preferably made in a mold structure such as is set forth in my co-pending application for patent, Serial No. 180,943 filed April 4, 1927.

The holder for use with this confection comprises a disc made of two separate layers 3 of waxed pasteboard or the like securely cemented together. Each layer is cut through for a portion of its area inwardly of its periphery to form a hinged tab 4, which when the holder is manufactured lies flat with the disc, but which may be bent outwardly when desired. At the outer ends of the tabs the two disc layers are cut away still further outwardly of the opening 5 outlining the tab as shown at 6. This forms a space for the insertion of a fingernail or the like for engagement with the adjacent end of the tab so that the latter may be easily pried out to its operative position. The position of the tabs on the two disc layers are reversed relative to each other so that the opening 5 left by one tab will be offset from the opening of the other tab, and each opening is covered across the bottom by the solid portion of the other disc layer.

In operation one tab of the holder is bent up by the manufacturer of the confection and inserted up to its hilt into the ice cream core 1 of the confection during the manufacture of the latter, while the ice cream is still soft and before it is finally frozen. The adjacent disc layer then completely covers the bottom of the confection and forms a support for the same. The other and outer tab is left folded, so that the confection may be packed for shipment and storage without the holder occupying any appreciable space. When the purchaser of the confection desires to consume the same, he pries out said outer tab, to the position shown in Fig. 1, and uses said tab as a handle for manipulating the confection without having to support and hold the latter with the fingers. The tab, which is embedded in the ice cream, will not pull out, since the solidly frozen condition of the cream is sufficient to hold said tab firmly in place.

The surfaces of the tab and disc abutting against the confection will not impart any obnoxious flavor thereto, since such surfaces are coated with paraffine or similar tasteless and sanitary material.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A holder for a confection comprising a disc to support one end of the confection, a tab projecting from one face of the disc to be inserted into the confection, and a tab projecting from the other face of the disc to serve as a handle.

2. A holder for a confection comprising a disc of bendable material to support one end of the confection, a tab formed integral with one face of the disc arranged to be bent outwardly therefrom to be inserted into the confection, and a similar tab formed with the other face of the disc normally disposed flush therewith and arranged to be bent outwardly to serve as a handle.

3. A holder for a confection comprising a disc member of a size sufficient to cover the base of the confection and arranged to support the same, a tab projecting from one face of the disc to be embedded in the confection, and a similar tab projecting from the opposite face of the disc to serve as a handle; the tabs being symmetrical and of the same size whereby to permit either tab being employed to engage the confection or to serve as the handle.

4. A holder for a confection comprising a disc member of a size sufficient to cover the base of the confection and arranged to support the same, said member consisting of a pair of superimposed elements secured together, one of said elements being cut through to form an outwardly bendable tab to enter the confection, and the other element being also cut through to form an outwardly bendable tab; said tabs being radially offset from each other whereby the openings in each element formed when the corresponding tab is bent outwardly is covered by the uncut portion of the other element.

5. A holder for a confection comprising a flat element to support one end of the confection, a tab projecting from one face of the element to extend into the confection, and a handle foldable against the element, mounted on the outer face thereof.

In testimony whereof I affix my signature.

VERNON A. VAN HORNE.